Aug. 22, 1967  R. W. RICHARDSON  3,337,242
HITCH STRUCTURE FOR AGRICULTURAL IMPLEMENTS
Filed Oct. 21, 1965  2 Sheets-Sheet 1
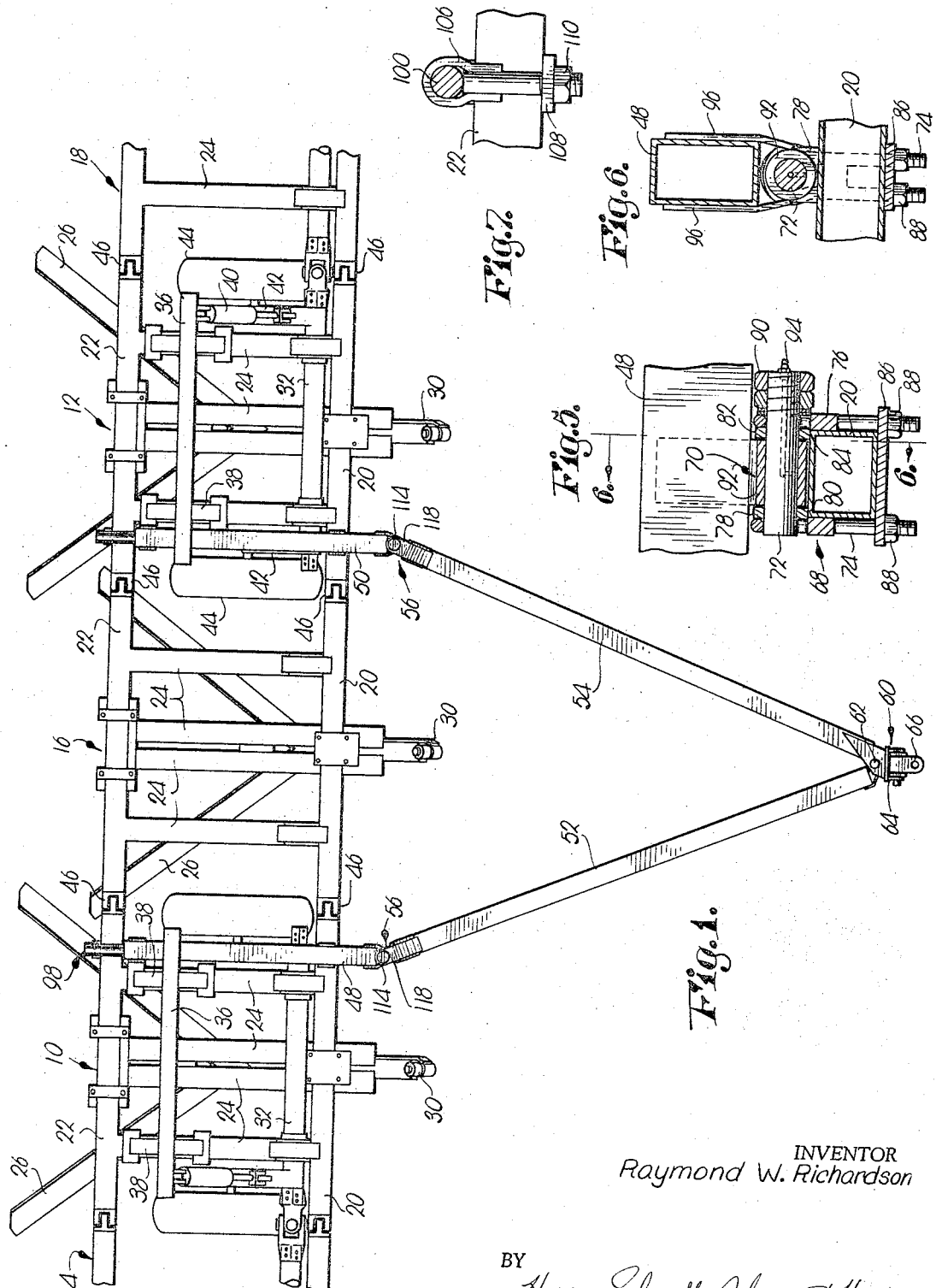
INVENTOR
Raymond W. Richardson
BY
Hovey, Schmidt, Johnson & Hovey
ATTORNEYS.

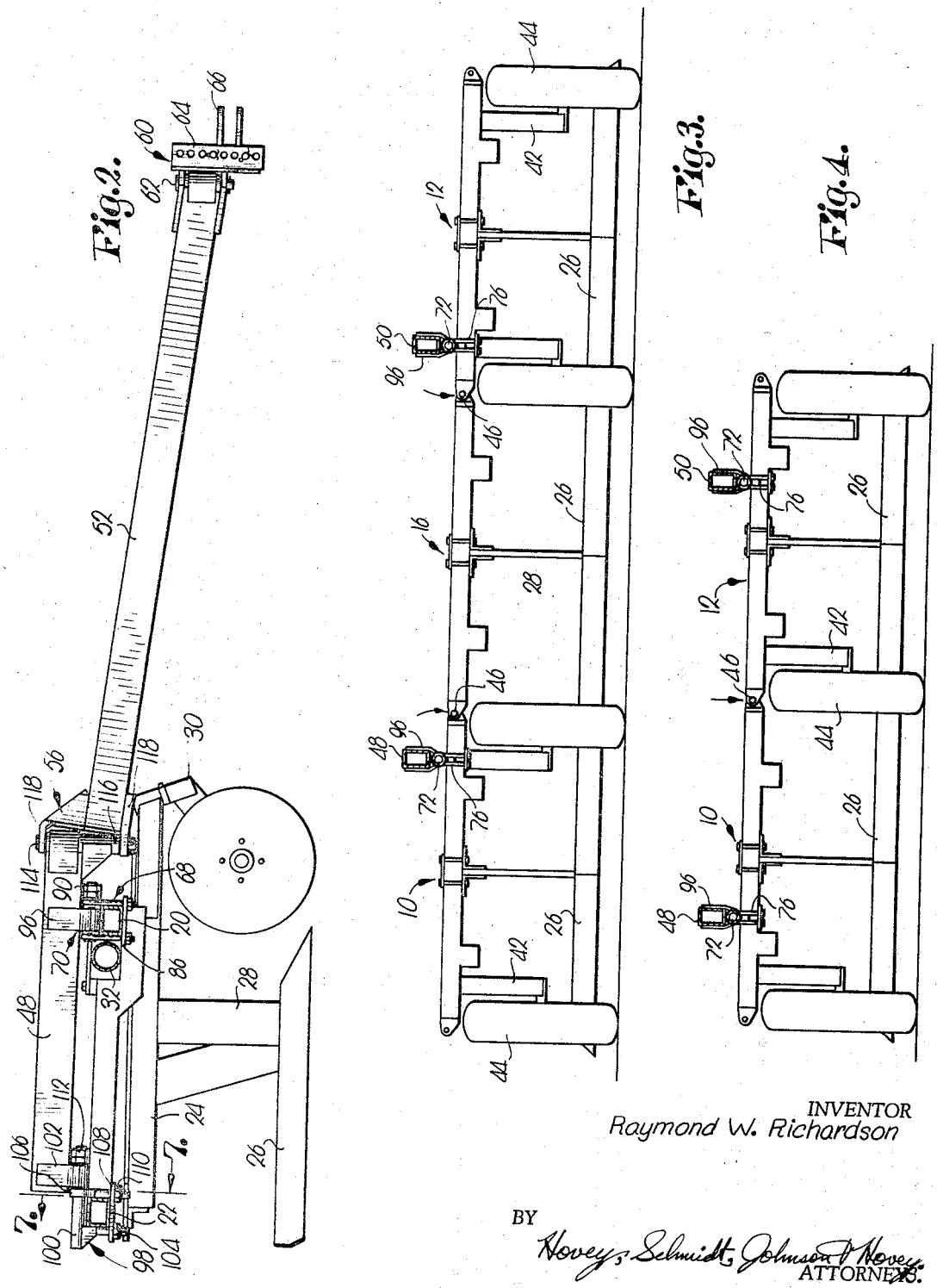

United States Patent Office 3,337,242
Patented Aug. 22, 1967

3,337,242
HITCH STRUCTURE FOR AGRICULTURAL
IMPLEMENTS
Raymond W. Richardson, Cawker City, Kans., assignor to Richardson Manufacturing Company, Inc., Cawker City, Kans., a corporation of Kansas
Filed Oct. 21, 1965, Ser. No. 500,150
8 Claims. (Cl. 280—411)

This invention relates to an improved hitch for use with multisection, chisel and undercutter agricultural implements.

In multisection implements where a number of sections are hingedly interconnected and arranged side-by-side or abreast with respect to the line of draft, the sections tend to shift from an initial, ground-conforming configuration to an arch configuration as the implement is drawn. The hitch which links the tractor with the implement is attached to the central portion thereof and, in conjunction with the resistance met by the blades of the implement as it is drawn, results in the production of a gathering force in the implement between the connection points of the hitch. Thus, the central sections tend to rise as they are drawn, thereby producing the undesirable arched configuration which, of course, causes the ground to be worked in a nonuniform fashion.

To arrest this arch action it has heretofore been necessary to periodically momentarily raise the implement blades out of the soil during movement to permit the implement sections to assume their normal, ground-conforming configuration. This, of course, impairs the quality of the fieldwork done by the implement, and is time-consuming since a second pass is required to work the soil previously skipped when the blades were raised.

Additionally, attempts have been made to eliminate the arching problem by increasing the weight of the central sections of the implement. This, however, has proven highly unsatisfactory even for small sizes. Once the arch has started to form, no amount of extra weight will level the arch and restore the implement to its ground-hugging condition. This has been proven on two section units as well as three, four and five section units. The above described hitch will work only when the soil conditions are easy and the plowing depth is shallow. This hitch functions properly only when draft per unit of width is very light. Such conditions exist so seldom in general farming as to make the above described hitch entirely unsatisfactory.

It is, therefore, the primary object of this invention to provide a hitch for such an implement which will prevent the arch action phenomenon discussed above and allow the sections of the implement to assume their normal ground-conforming attitude.

As a corollary to the foregoing object, it is a further aim of the invention to provide such a hitch that will supply dynamic forces during use which prevent the arch action, and produce force reactions which, if undesirable, can be controlled by varying the weight distribution among the sections or by other suitable means.

An additional object is to provide a hitch as aforesaid which prevents the undesirable arch action without restricting the flexibility of the various plow sections, thereby assuring that a ground-hugging, contour-conforming characteristic will be realized.

In the drawings:
FIGURE 1 is a plan view of a five-section implement with the hitch attached, portions of the outside sections being broken away;

FIG. 2 is a side elevational view of the implement;
FIG. 3 is a diagrammatic, frontal, vertical sectional view of the implement shown in FIG. 1, the outside sections being removed;

FIG. 4 is a diagrammatic frontal, vertical sectional view of a two-section implement illustrating the hitch connection thereto;

FIG. 5 is a fragmentary, side elevational view of the front mounting device of one of the draft beams, enlarged with respect to the showing of FIG. 2;

FIG. 6 is a vertical sectional view taken along line 6—6 of FIG. 5; and

FIG. 7 is a vertical sectional view taken along line 7—7 of FIG. 2.

The figures illustrate a multisection stubble mulch plow of conventional construction. Referring to FIGS. 1 and 3, the numerals 10 and 12 designate the primary sections of a five-section unit, the secondary sections thereof being denoted 14, 16 and 18. Secondary sections 14 andl 18 are shown fragmentarily and are illustrated only in FIG. 1; however, it should be understood that, with sections 14 and 18 removed, an operable three-section unit is formed.

Each section is identical in construction except for the number of wheels provided, and comprises a pair of front and rear, transverse frame members 20 and 22, four cross members 24, a sweep blade 26 suspended from the members by a standard 28, and a coulter assembly 30. Sections 10 and 12 are also each provided with a horizontal, sectionalized shaft 32 connected to the shaft section of the adjacent, outside implement section by a universal joint 34, and an elevated bar 36 supported by standards 38.

A hydraulic piston and cylinder assembly 40 is coupled between bar 36 and shaft 32 and is operable to rotate the latter to, in turn, swing a pair of legs 42 extending therefrom and mounting respective wheels 44. In this manner, wheels 44 are raised or lowered to control the elevation of blades 26 with respect to the surface of the soil. The various implement sections are hingedly joined by clevis and pin connections 46 at the mating ends of adjacent transverse frame members 20 and 22.

The section combination illustrated in FIG. 4 differs from that shown in FIGS. 1 and 3 in that the two primary sections 10 and 12 are not separated by a secondary section. This arrangement is utilized in units employing an even number of sections, it being appreciated that additional sections may be added abreast of sections 10 and 12.

The hitch structure of the instant invention comprises a pair of horizontal draft beams 48 and 50 extending from front to rear in overlying relationship to the frames of primary sections 10 and 12 respectively. A pair of hitch arms 52 and 54 have their rearward ends connected to the forward ends of beams 48 and 50, respectively, by a pair of couplings 56. The forward ends of arms 52 and 54 are interconnected by a tractor hitch mount 60, which includes a pintle 62 received by arms 52 and 54, an elevational adjustment assembly 64, and a U-shaped strap 66 attached to the tractor frame (not shown) which projects from assembly 64 for rotation about a horizontal axis.

Each beam 48 or 50 is mounted on the associated frame in the same manner by a pair of mounting devices, such devices being shown in detail in FIGS. 2 and 5–7 with respect to beam 48. The front mounting device comprises a stationary component 68 rigidly secured to member 20, and a movable element 70 rigid with beam 48.

Component 68 includes a horizontal axle 72 having its longitudinal axis disposed in parallelism with the line of draft of the implement, the rearward end of the axle being welded to a double shank eyebolt 74 while the forward end is received by a double shank eyebolt 76. A spacer 78 is rigid with bolt 74 at the eye portion thereof and presents a shoulder 80 overlying and engaging the edge of member 20. Similarly, a spacer 82 is rigid with eyebolt 76 and presents a shoulder 84 overlying the opposite edge of member 20. A plate 86 underlies member 20 and receives the shanks of bolts 74 and 76; thus, member 20 is securely clamped between shoulders 80, 84 and plate 86 upon tightening of nuts 88.

The forward end of axle 72 is threaded to receive a pair of nuts 90 which may be locked against each other for assuring that axle 72 will be held securely in place and at the same time sleeve 92 will be free to rotate about axle 72. A sleeve 92 of element 70 serves as a bushing which rotates on axle 72, lubrication being supplied by an internal passage (shown in broken lines in FIG. 5) in axle 72 communicating with a lube nipple 94. A pair of straps 96 extend upwardly from sleeve 92 and are welded to the opposed sides of beam 48.

The rear mounting device (FIGS. 2 and 7) comprises a stationary component 98 including a horizontal axle 100 aligned with axle 72 and a movable element 102 rotatable thereon. The axle 100 is rigid with a depending shank 104 adjacent its rearward end, and is received by an eyebolt 106 at its midportion. A plate 108 underlies frame member 22 and receives shank 104 and the shank of bolt 106, tightening of nuts 110 thereby clamping member 22 firmly between axle 100 and plate 108. A pair of nuts 112 are threaded on the forward end of axle 100, the portion of the axle between bolt 106 and nuts 112 serving as the stationary bearing surface for the bushing part of rotatable element 102 which is of identically the same construction as element 70.

Each coupling 56 (FIG. 2) comprises a pintle 114 received by an upright hinge barrel 116 rigid with the forward end of the associated beam 48 or 50. The rearward end of the corresponding hitch arm 52 or 54 is provided with a pair of vertically spaced, rearwardly projecting ears 118 receiving hinge barrel 116 therebetween and which are apertured to receive pintle 114.

In use, nuts 112 on the forward end of axle 100 are adjusted such that, under pull, the forward end of the bushing part of element 102 forcibly contacts the washers between it and nuts 112 at the same time that the forward end of sleeve 92 forcibly contacts spacer 82. Thus, the draft is uniformly distributed between the transverse frame members 20 and 22.

It will be appreciated that the journals formed by the two mounting devices associated with a particular beam 48 or 50 define an axis of rotation for the beam between it and the corresponding implement section frame, such axis extending in parallelism with the longitudinal axis of the beam and the line of draft of the implement. (The line of draft extends through hitch mount 60 and is centered on the central section 16 in FIGS. 1 and 3.) In FIG. 3, it may be seen that, in an implement having an odd number of sections, beams 48 and 50 will shift through a relatively small displacement in directions toward one another when the drawing force is applied. The arrows indicate the resultant downward force due to the couple existing between the axles 100, 72 and pin connections 46. It is understood, of course, that blades 26 are in their operative positions beneath the surface of the soil when the foregoing force reactions are produced.

In addition to the above, arms 52 and 54 under tension develop gathering forces at the right and left of axle 72. Equal and opposite forces are developed thereby at connections 46. In FIG. 3, section 10 tends to rotate clockwise and section 12, counterclockwise. Section 16 is, therefore, thrust downwardly and arch action prevented. In FIG. 4, section 10 tends to rotate clockwise and section 12 counterclockwise, thrusting connections 46 and wheel 44 downwardly and arch action is prevented.

A similar effect is experienced in implement units having an even number of sections as illustrated in FIG. 4. Here, the line of draft is centered on the connections 46 between the two primary sections 10 and 12. The gathering force between the right and left of axle 72 are met by equal and opposite forces in connections 46. Thus, section 10 tends to rotate clockwise and section 12 counterclockwise. The arrow pointing downwardly over the center represents the force preventing the arch from forming upwardly.

It should be understood that, although hitch arms 52 and 54 are of heavy, rigid construction, the forces produced during operation of an implement such as shown are quite high and actually cause a gathering force between the right and left of axles 72. This results in twisting the hitch arms a slight amount which, in turn, causes beams 48 and 50 to rotate slightly. This is the strain resulting from the forces in the system. Thus, arching of the sections is positively precluded without interfering with the flexibility of the implement structure and, through adjustment of nuts 112, the draft is uniformly distributed.

Having thus described the invention, what is claimed as new and desired to be secured by Letters Patent is:

1. For use with a multisection implement having a pair of primary sections each provided with a supporting frame, a hitch comprising:
   a pair of draft beams each having opposed, forward and rearward ends;
   structure coupled with said beams for securing the latter to respective frames;
   said structure providing an axis of rotation for each beam parallel to the longitudinal axis thereof and disposed between each beam and the corresponding frame upon attachment of said beams to said frames;
   a pair of hitch arms having opposed, forward and rearward ends, the rearward ends being spaced apart;
   a pair of couplings connecting the rearward ends of said arms with respective beams; and
   means intercoupling the forward ends of said arms for connecting the same to a drawing vehicle, whereby to prevent arching of the sections when the implement is drawn.

2. The invention of claim 1,
   said structure being spaced from the forward end of each beam,
   said couplings connecting said rearward ends of the arms to the forward ends of respective beams.

3. The invention of claim 1,
   said structure including a pair of longitudinally spaced journals associated with each beam respectively,
   each pair of journals being disposed in alignment with each other and defining the axis of rotation of the corresponding beam.

4. The invention of claim 3,
   each pair of journals being spaced from the forward end of the corresponding beam,
   said couplings connecting said rearward ends of the arms to the forward ends of respective beams.

5. The invention of claim 1,
   said structure including a pair of longitudinally spaced mounting devices associated with each beam respectively,
   each of said devices having a stationary component adapted for attachment to the corresponding frame, and a movable element rigid with the respective beam and rotatably carried by said component.

6. The invention of claim 5, each of said components including an axle and means for mounting the axle on the corresponding frame with its axis extending in substantial parallelism to the line of draft of the implement.

7. The invention of claim 6, each of said elements being rotatable on the associated axle, each axle mounting means being provided with a stop engageable by the element when the implement is drawn.

8. The invention of claim 7, each pair of devices being spaced from the forward end of the corresponding beam, said couplings connected said rearward ends of the arms to the forward ends of respective beams.

References Cited
UNITED STATES PATENTS

| | | | |
|---|---|---|---|
| 2,319,751 | 5/1943 | Silver | 280—411 |
| 2,640,405 | 6/1953 | Wheeler | 172—310 X |
| 2,641,886 | 6/1953 | Graham | 172—311 |
| 3,256,942 | 6/1966 | Van Sickle | 172—310 |

LEO FRIAGLIA, *Primary Examiner.*